(12) United States Patent
Yang et al.

(10) Patent No.: US 11,313,480 B2
(45) Date of Patent: Apr. 26, 2022

(54) VALVE MECHANICAL LINKAGE SYSTEM

(71) Applicants: BEIJING AEROSPACE PROPULSION INSTITUTE, Beijing (CN); BEIJING AEROSPACE PETROCHEMICAL TECHNOLOGY & EQUIPMENT ENGINEERING CORPORATION LIMITED, Beijing (CN)

(72) Inventors: Fan Yang, Beijing (CN); Qingzhao Yang, Beijing (CN); Yingren Ding, Beijing (CN); Jingbo Han, Beijing (CN); Jin Guo, Beijing (CN); Xiang Su, Beijing (CN); Jinxian Liu, Beijing (CN); Huan Yang, Beijing (CN); Qiang Li, Beijing (CN); Yusheng Guo, Beijing (CN)

(73) Assignees: Beijing Aerospace Propulsion Institute, Beijing (CN); Beijing Aerospace Petrochemical Technology & Equipment Engineering Corporation Limited, Beijing (CN)

(*) Notice: Subject to any disclaimer, the term of this patent is extended or adjusted under 35 U.S.C. 154(b) by 0 days.

(21) Appl. No.: 16/761,614

(22) PCT Filed: Jan. 28, 2019

(86) PCT No.: PCT/CN2019/073314
§ 371 (c)(1),
(2) Date: May 5, 2020

(87) PCT Pub. No.: WO2020/034598
PCT Pub. Date: Feb. 20, 2020

(65) Prior Publication Data
US 2020/0256473 A1 Aug. 13, 2020

(30) Foreign Application Priority Data
Aug. 16, 2018 (CN) .......................... 201810935241.3

(51) Int. Cl.
F16K 11/14 (2006.01)
F16K 31/524 (2006.01)
F16K 31/54 (2006.01)

(52) U.S. Cl.
CPC ............ *F16K 11/14* (2013.01); *F16K 31/524* (2013.01); *F16K 31/54* (2013.01); *Y10T 137/87732* (2015.04)

(58) Field of Classification Search
CPC ........ F16K 11/14; F16K 31/524; F16K 31/54; F16K 31/52475; F16K 31/44;
(Continued)

(56) References Cited

U.S. PATENT DOCUMENTS 979,532 A * 12/1910 Merrill .................... F16K 11/16
137/865
4,622,997 A * 11/1986 Paddington ........... F16L 37/373
137/595

(Continued)

FOREIGN PATENT DOCUMENTS

| CA | 2169918 | 6/1995 |
| CN | 2196220 | 5/1995 |
| CN | 1130936 | 9/1996 |
| CN | 201582475 | 9/2010 |
| CN | 104806777 | 7/2015 |
| CN | 104913102 | 9/2015 |

(Continued)

OTHER PUBLICATIONS

International Search Report for PCT/CN2019/073314 dated Mar. 13, 2019, 11 pages.

*Primary Examiner* — Craig J Price
*Assistant Examiner* — Andrew J Rost
(74) *Attorney, Agent, or Firm* — Dority & Manning, P.A.

(57) ABSTRACT

Disclosed is a valve mechanical linkage system. A valve comprises a main valve and a secondary valve; the system
(Continued)

comprises a first transmission mechanism and a second transmission mechanism; the first transmission mechanism is connected with the main valve and used for converting the up-and-down reciprocating motion of the main valve into a rotational reciprocating motion; the first transmission mechanism and the second transmission mechanism are connected by means of a coupling (4), and the rotational force of the rotational reciprocating motion is transferred to the second transmission mechanism by means of the coupling (4); the second transmission mechanism is connected with the secondary valve, and achieves on-off control on the secondary valve by converting the rotational reciprocating motion into the up-and-down reciprocating motion.

11 Claims, 3 Drawing Sheets

(58) Field of Classification Search
CPC ........ F16K 3/0254; F16K 3/029; F16K 11/18; C10G 9/18; C10G 9/16; C10B 33/12; Y10T 137/87732
USPC .......................................................... 137/595
See application file for complete search history.

(56) References Cited

U.S. PATENT DOCUMENTS

| | | | | |
|---|---|---|---|---|
| 4,749,004 | A * | 6/1988 | Peash | F16K 11/165 |
| | | | | 137/865 |
| 4,783,048 | A * | 11/1988 | St. Clair | F16K 3/0281 |
| | | | | 251/129.11 |
| 6,321,774 | B1 | 11/2001 | Ott | |
| 6,964,727 | B2 * | 11/2005 | Lah | C10B 25/10 |
| | | | | 202/242 |
| 7,413,163 | B2 * | 8/2008 | Maxwell | F16K 3/0254 |
| | | | | 251/250 |
| 7,810,786 | B2 * | 10/2010 | Frias | F16K 3/0281 |
| | | | | 251/291 |
| 7,837,176 | B2 * | 11/2010 | Loga | F15D 1/0005 |
| | | | | 251/250 |
| 10,047,867 | B2 * | 8/2018 | Kim | F16K 31/60 |
| 2003/0102036 | A1 * | 6/2003 | Sosa | F16K 5/0605 |
| | | | | 137/595 |
| 2009/0050830 | A1 * | 2/2009 | Albert | F16K 35/14 |
| | | | | 251/129.11 |

FOREIGN PATENT DOCUMENTS

| | | |
|---|---|---|
| CN | 108895180 | 11/2018 |
| JP | 2009014020 | 1/2009 |

* cited by examiner

VALVE MECHANICAL LINKAGE SYSTEM

The present application is the national phase of International Application No. PCT/CN2019/073314, titled "VALVE MECHANICAL LINKAGE SYSTEM", filed on Jan. 28, 2019, which claims the priority to Chinese Patent Application No. 201810935241.3 titled "VALVE MECHANICAL LINKAGE SYSTEM", filed with the China National Intellectual Property Administration on Aug. 16, 2018, which is incorporated herein by reference in its entirety.

FIELD

The present disclosure relates to the technical field of mechanical engineering, and in particular to a mechanical linkage system for valves.

BACKGROUND

In ethylene plants, ethylene cracking furnaces are key equipment for the production of ethylene. The cracking gas valve and the decoking valve, as the shut-off valve for the cracking furnace and the decoking pipeline, play an extremely important role. Their performance is related to the production safety of the entire plant. The cracking gas valve is configured to cut off the communication between the cracking furnace and the pyrolysis gas main pipeline, and the decoking valve is configured to cut off the communication between the cracking furnace and the decoking pipeline. When the cracking furnace is shifted between the process mode and the decoking mode, if the cracking gas valve and the decoking valve are not operated in a correct order, the pyrolysate may flow back into the decoking pipe and the cracking furnace, and the pyrolysis gas pipeline may be blocked, causing severe overpressure.

In order to avoid this situation, a mechanical linkage mechanism is generally used for overpressure protection. Through the mechanical linkage mechanism, precise control of the opening degree of the cracking gas valve and the decoking valve can be achieved to ensure the pressure to fluctuate within a safe range.

However, the currently known valve mechanical linkage mechanism technology has the following disadvantages:

1) Extreme high accuracy requirements. The accuracy includes design accuracy, machining accuracy, mounting accuracy, and positioning accuracy. Since the main valve and the auxiliary valve share a double-slotted linkage member, in order to achieve precise control, the path line of the roller linked by the two valves is required to be strictly accurate, the deviation from the rotational axis should not be too large, and extremely high machining accuracy is required; if there is a deviation from the rotational axis, the transmission will be adversely affected, so high installation and positioning accuracy is also required; and, since the arm lengths of the driving force and the resistance are always changing during the shift of the main valve and the auxiliary valve, the path line of the groove of the auxiliary valve is very complicated, and the curvature is always changing, which brings great inconvenience to both design and manufacturing.

2) Yielding to pipeline stress. Since the on-site installation of the valves is subjected to installation errors such as misalignment of the pipelines (axis offset or angular deviation), and bolt hole offset in flange connection, the valves are generally affected by the pipeline stress. During the operation, taking temperature changes and pressure changes into account, the effect of the pipeline stress is more serious. This effect causes the relative position of the valves to change, which includes changes of the main and auxiliary valves themselves and relative position changes between the two valves. Since the linkage member connecting the main and auxiliary valves is integrated, that is, the main and auxiliary valves are rigidly connected, once the positions of the valves change or the valves are deformed, the geometric tolerances between the transmission roller and the corresponding groove will be greatly increased, which will directly affect the transmission accuracy, and even cause the complete detachment of the drive roller from the linkage member and the failure of the linkage system.

3) According to the above, even if the valves are only slightly deformed, which is unlikely to cause the transmission to be unstable, there will be changes in the mating surface of the roller and the linkage member. These changes will cause excessive wear of the surface of the transmission roller, affecting the service life of the transmission roller.

SUMMARY

The technical solution of the present disclosure is to provide a mechanical linkage system for special valves applied in the energy chemical industry, which is capable of achieving specific opening-closing cooperation actions according to use requirements.

The technical solution of the present disclosure is as follows: A mechanical linkage system for valves, where the valves includes a main valve and an auxiliary valve, the system includes a first transmission mechanism and a second transmission mechanism; the first transmission mechanism is connected with the main valve for converting up-down reciprocating motion of the main valve into rotary reciprocating motion; the first transmission mechanism and the second transmission mechanism are connected by a coupling, and a rotary force of the rotary reciprocating motion is transferred to the second transmission mechanism through the coupling; and the second transmission mechanism is connected with the auxiliary valve, and control of opening and closing of the auxiliary valve is achieved by converting the rotary reciprocating motion into the up-down reciprocating motion.

Preferably, the first transmission mechanism has a rack-and-gear structure.

Preferably, the rack in the rack-and-gear structure is a driving member mounted on a moving assembly of the main valve; and the gear is a follower mounted on a bracket of the main valve.

Preferably, the second transmission mechanism is a cam.

Preferably, the cam is fixedly connected to a bracket of the auxiliary valve, a groove is provided on the cam, and a protruding roller on a moving assembly of the auxiliary valve is embedded in the groove to achieve the up-down reciprocating motion of the moving assembly of the auxiliary valve along with rotation of the cam.

Preferably, the groove is configured to meet a stroke cooperation relationship between the main valve and the auxiliary valve.

Preferably, the groove includes an arc segment, a straight segment and/or a curved segment connected end to end; a radius of the arc segment is constant, and in a case that the protruding roller of the moving assembly of the auxiliary valve moves in the arc segment, the moving assemblies of the main valve and the auxiliary valve remain unchanged.

Preferably, the coupling is a flexible coupling.

Preferably, the flexible coupling has one of the following structures: a universal joint structure, a cross slide-block, a toothed coupling, and a coupling with an elastic element.

Preferably, a valve body of the main valve is a valve body of a cracking gas valve, the bracket of the main valve is a bracket of the cracking gas valve, and the moving assembly of the main valve is a valve core and a valve stem of the cracking gas valve.

Preferably, a driving mode of an actuator of the main valve is one of pneumatic, hydraulic, electric and manual.

Preferably, the bracket of the auxiliary valve is a bracket of a decoking valve, and the moving assembly of the auxiliary valve is a valve core and a valve stem of the decoking valve.

Preferably, the valves are special valves applied in the energy chemical industry.

Compared with the conventional technology, the present disclosure has the following advantageous effects.

A rack-and-gear type main valve drive structure, a variable cam type auxiliary valve drive structure and a main-auxiliary valve linkage structure connected by a flexible coupling between the main and auxiliary valves are provided according to the present disclosure. In this solution, the main and auxiliary valves are connected by a coupling, and their respective mechanisms are fixed on their own valve brackets without affecting each other. Specifically, the disadvantages of the conventional technology can be effectively solved according to the present disclosure.

1) According to the present disclosure, the rack-and-gear structure is only fixedly connected to the main valve, and the cam structure is only fixedly connected to the auxiliary valve. Since the flexible coupling is provided between the two valves, all-around errors can be compensated while ensuring smooth transmission, therefore avoiding the influence of the pipeline stress.

2) Since the cam structure is only fixedly connected to the auxiliary valve, excessive wear of the transmission roller not expected by the design working condition will not occur, which is beneficial to the service life of the system.

3) The transmission of the rack-and-gear system is precise, and a stroke of the auxiliary valve can be flexibly adjusted according to the size of the gear.

4) There is no force arm change similar to the conventional technology in the stroke control of the auxiliary valve, and the path line, that is, the slot of the cam is a conversion of the strokes, so that the design accuracy, machining accuracy and installation accuracy are easier to meet.

REFERENCE NUMERALS

Figure 1:
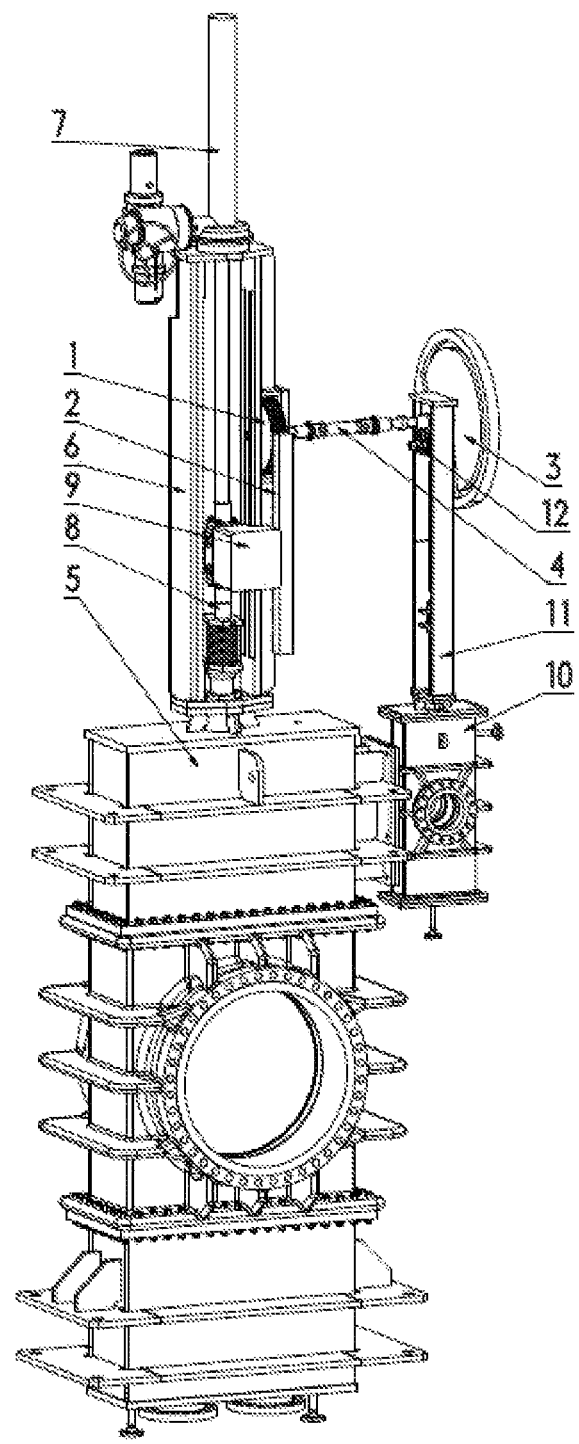
FIG. 1 is a schematic structural view of an embodiment according to the present disclosure.

| | |
|---|---|
| 1 gear, | 2 rack, |
| 3 cam, | 4 flexible coupling, |
| 5 main valve body, | 6 main valve bracket, |
| 7 main valve actuator, | 8 main valve moving assembly, |
| 9 main valve coupling, | 10 auxiliary valve body, |
| 11 auxiliary valve bracket, | 12 auxiliary valve moving assembly. |

DETAILED DESCRIPTION OF THE EMBODIMENTS

The technical solutions according to the present application are described in detail in conjunction with drawings and specific embodiments.

A mechanical linkage system for valves is provided according to the present disclosure, which is particularly suitable for special valves applied in the energy chemical industry. A main valve and an auxiliary valve are mechanically linked in the system to achieve specific opening-closing cooperation actions according to use requirements. Specifically, the mechanical linkage system for valves includes a first transmission mechanism and a second transmission mechanism; the first transmission mechanism is connected to the main valve for converting up-down reciprocating motion of the main valve into rotary reciprocating motion; the first transmission mechanism and the second transmission mechanism are connected by a coupling, and a rotary force of the rotary reciprocating motion is transferred to the second transmission mechanism through the coupling; and the second transmission mechanism is connected with the auxiliary valve, and control of opening and closing of the auxiliary valve is achieved by converting the rotary reciprocating motion into the up-down reciprocating motion. In order to compensate all-around errors while ensuring smooth transmission and avoiding the influence of pipeline stress, a coupling in the present disclosure is a flexible coupling.

The first transmission mechanism and the second transmission mechanism may be any mechanical structure that satisfies the above functional requirements. In the present embodiment, a rack-and-gear structure and a cam structure are preferably provided.

A rack in the rack-and-gear structure is a driving member mounted on a moving assembly of the main valve; and the gear is a follower mounted on a bracket of the main valve. A cam is fixedly connected to a bracket of the auxiliary valve, and a groove is provided on the cam. The groove is in cooperation with a protruding roller on a moving assembly of the auxiliary valve to achieve up-down reciprocating motion of the moving assembly of the auxiliary valve along with rotation of the cam.

The groove is configured to meet a stroke cooperation relationship between the main valve and the auxiliary valve. Specifically, the groove may be provided as a free combination of an arc and a straight line or a curved line according to actual requirements or calculation results, and the proportion of each part constituting the groove may be arbitrarily combined according to the calculation results. When the roller of the moving assembly of the auxiliary valve is in the arc part of the groove, the moving assembly of the auxiliary valve remains unchanged during the movement of the main valve; and when the roller of the moving assembly of the auxiliary valve is in the remaining part, the moving assembly of the auxiliary valve moves up and down as the shape of the groove changes, thereby achieving the design intention, that is, changing the stroke position of the auxiliary valve at any time along with the movement of the main valve.

The following embodiment is provided according to the present disclosure.

As shown in FIG. 1, a mechanical linkage system for valves provided according to the present disclosure includes a gear 1, a rack 2, a cam 3, a flexible coupling 4, a main valve body 5, a main valve bracket 6, a main valve actuator 7, a main valve moving assembly 8, a main valve coupling 9, an auxiliary valve body 10, an auxiliary valve bracket 11, and an auxiliary valve moving assembly 12.

1. Main Valve

A drive structure of rack-and-gear is adopted in the main valve, where the mail valve actuator 7, the main valve body 5, and the gear 1 are respectively fixedly connected to the main valve bracket 6.

Figure 2:
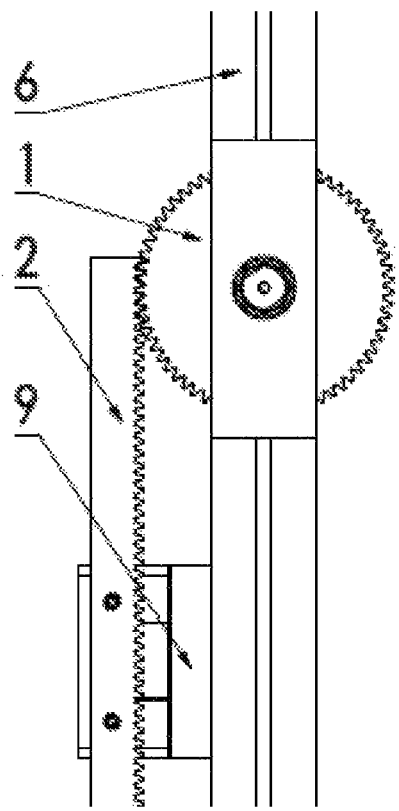
FIG. 2 is a schematic view of a rack-and-gear mechanism according to the present disclosure.

As shown in FIG. 2, the gear 1 is a follower in the cooperation of the rack-and-gear structure, which is mounted on the main valve bracket 6, is in cooperation with the rack 2, and is fixedly connected to the flexible coupling 4 to drive the cam 3 to rotate.

The rack 2 is a driving member in the cooperation of the rack-and-gear structure, which is mounted on the main valve coupling 9, and reciprocates under the drive of the main valve moving assembly 8 to drive the gear 1 to reciprocate.

The rack 2 drives the gear 1 to perform reciprocating rotation.

Figure 3:
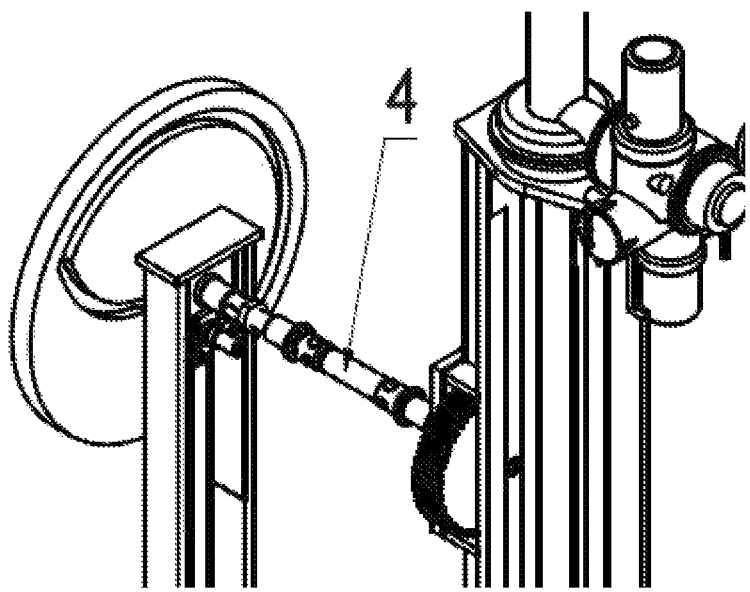
FIG. 3 is a schematic view of a flexible coupling mechanism according to the present disclosure.

As shown in FIG. 3, the main valve and the auxiliary valve are connected by the flexible coupling 4, and a rotary force of the gear 1 in the main valve is transferred to the cam 3 of the auxiliary valve through the flexible coupling 4 to finally drive the auxiliary valve to be opened or closed, thereby controlling an opening degree of the auxiliary valve.

In the present embodiment, the flexible coupling 4 is one of the following structures: a universal joint structure, a cross slide-block, a toothed coupling, and a coupling with an elastic element.

The main valve actuator 7 is configured to drive the main valve moving assembly 8 to move; and in the present embodiment, a driving mode of the main valve actuator 7 is one of pneumatic, hydraulic, electric and manual.

The main valve moving assembly 8 is fixedly connected to the main valve coupling 9 and is driven by the main valve actuator 7 to move up and down in a straight stroke-direction of the main valve, and drives the rack 2 to perform linear reciprocating motion.

The main valve coupling 9 is fixedly connected to the main valve moving assembly 8 and the rack 2, and moves along with the main valve moving assembly 8.

In the present embodiment, the main valve body 5 is a valve body of a cracking gas valve, the main valve bracket 6 is a bracket of the cracking gas valve, and the main valve moving assembly 8 is a valve core and a valve stem of the cracking gas valve.

2. Auxiliary Valve

The auxiliary valve is driven by the cam 3, and the cam 3 is fixedly connected to the auxiliary valve bracket 11 for reciprocating rotation.

The cam 3 is fixedly connected to the flexible coupling 4, and rotates along with the rotation of the gear 1, and a groove is provided on an upper portion of the cam according to a stroke cooperation relationship between the main valve and the auxiliary valve.

Figure 4:
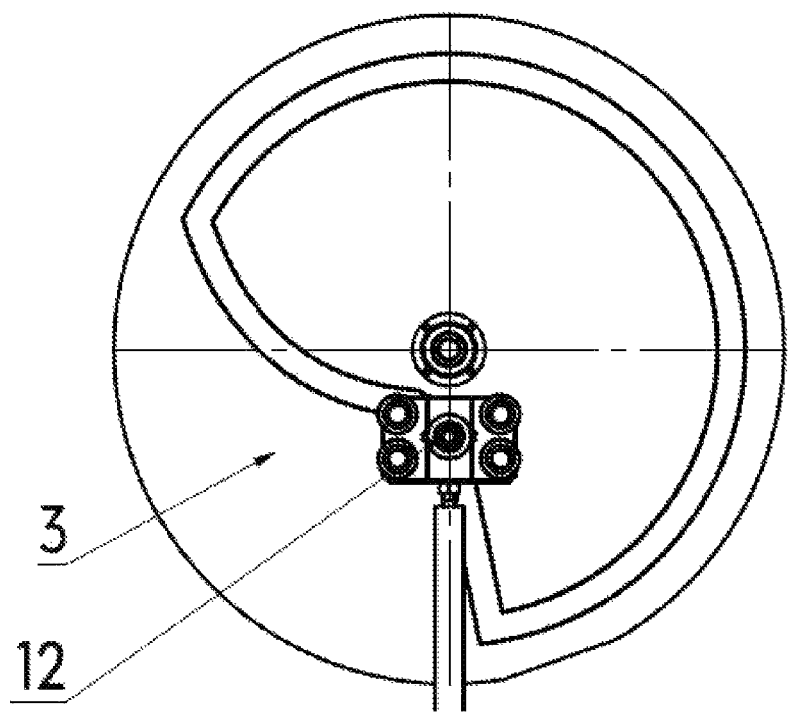
FIG. 4 is a schematic view of a cam mechanism according to the present disclosure.

As shown in FIG. 4, the auxiliary valve moving assembly 12 includes a protruding roller, and the roller is embedded in the groove of the cam 3. The auxiliary valve moving assembly 12 reciprocates up and down along with the rotation of the cam 3.

The auxiliary valve bracket 11 is connected to the cam 3, the auxiliary valve body 10 is fixedly connected to the auxiliary valve bracket 11, and the cam 3 is fixedly connected to the flexible coupling 4.

The transmission roller in the auxiliary valve moving assembly 12 moves in the groove provided in the cam 3 under the drive of the cam 3, and drives the auxiliary valve moving assembly 12 to move up and down in the auxiliary valve body 10 along with the reciprocating rotation of the cam 3, to achieve the opening and closing of the auxiliary valve.

In the present embodiment, the auxiliary valve bracket 11 is a bracket of a decoking valve and the auxiliary valve moving assembly 12 is a valve spool and valve stem of the decoking valve.

During the working process, the main valve is first in a fully open position, and the auxiliary valve is in a fully closed position; Then the main valve is moved to a closed position under the drive of the actuator, and although the cam 3 is already rotating, a radius of the effective groove keeps unchanged at this stage, so the position of the auxiliary valve does not change.

The invention claimed is:

1. A mechanical linkage system for valves, the valves comprising a main valve and an auxiliary valve, wherein
   the system comprises a first transmission mechanism and a second transmission mechanism;
   the first transmission mechanism is connected to the main valve, and is configured to convert up-down reciprocating motion of the main valve into rotary reciprocating motion;
   the first transmission mechanism and the second transmission mechanism are connected by a coupling, and a rotary force of the rotary reciprocating motion is transferred to the second transmission mechanism through the coupling; and
   the second transmission mechanism is connected with the auxiliary valve, and control of opening and closing of the auxiliary valve is achieved by converting the rotary reciprocating motion into the up-down reciprocating motion;
   the second transmission mechanism is a cam, and
   the cam is fixedly connected to a bracket of the auxiliary valve, a groove is provided on the cam, and a protruding roller on a moving assembly of the auxiliary valve is embedded in the groove to achieve up-down reciprocating motion of the moving assembly of the auxiliary valve along with rotation of the cam.

2. The mechanical linkage system for valves according to claim 1, wherein the first transmission mechanism is a rack-and-gear structure.

3. The mechanical linkage system for valves according to claim 2, wherein a rack in the rack-and-gear structure is a driving member mounted on a moving assembly of the main valve, and a gear in the rack-and-gear structure is a follower mounted on a bracket of the main valve.

4. The mechanical linkage system for valves according to claim 1, wherein the groove is configured to meet a stroke cooperation relationship between the main valve and the auxiliary valve.

5. The mechanical linkage system for valves according to claim 4, wherein the groove comprises an arc segment, a straight segment and/or a curved segment connected end to end, a radius of the arc segment is constant, and in a case that the protruding roller of the moving assembly of the auxiliary valve moves in the arc segment, the moving assemblies of the main valve and the auxiliary valve remain unchanged.

6. The mechanical linkage system for valves according to claim 1, wherein the coupling is a flexible coupling.

7. The mechanical linkage system for valves according to claim 6, wherein the flexible coupling is one of the following structures: a universal joint structure, a cross slide-block, a toothed coupling, and a coupling with an elastic element.

8. The mechanical linkage system for valves according to claim 1, wherein a valve body of the main valve is a valve body of a cracking gas valve, a bracket of the main valve is a bracket of the cracking gas valve, and a moving assembly of the main valve is a valve core and a valve stem of the cracking gas valve.

9. The mechanical linkage system for valves according to claim 1, wherein a driving mode of an actuator of the main valve is one of pneumatic, hydraulic, electric and manual.

10. The mechanical linkage system for valves according to claim 1, wherein a bracket of the auxiliary valve is a bracket of a decoking valve, and a moving assembly of the auxiliary valve is a valve core and a valve stem of the decoking valve.

11. The mechanical linkage system for valves according to claim 1, wherein the valves are special valves applied in energy chemical industry.

\* \* \* \* \*